United States Patent
Chen et al.

(10) Patent No.: US 7,416,661 B2
(45) Date of Patent: Aug. 26, 2008

(54) MECHANICAL FLOTATION DEVICE FOR REDUCTION OF OIL, ALKALINITY AND UNDESIRABLE GASES

(75) Inventors: James C. T. Chen, Houston, TX (US); Shaya Movafaghian, Houston, TX (US)

(73) Assignee: Petreco International Inc., Houston, TX (US)

( * ) Notice: Subject to any disclaimer, the term of this patent is extended or adjusted under 35 U.S.C. 154(b) by 492 days.

(21) Appl. No.: 11/096,786

(22) Filed: Apr. 1, 2005

(65) Prior Publication Data

US 2006/0231504 A1    Oct. 19, 2006

(51) Int. Cl.
*C02F 1/24* (2006.01)
*B01D 19/00* (2006.01)

(52) U.S. Cl. .................. 210/221.2; 210/221.1; 210/97; 210/109; 210/124; 96/217

(58) Field of Classification Search .............. 210/703, 210/221.2, 718, 708, 221.1, 97, 109, 124; 96/217
See application file for complete search history.

(56) References Cited

U.S. PATENT DOCUMENTS

| | | | |
|---|---|---|---|
| 2,294,827 A | 9/1942 | Booth | |
| 2,718,275 A | 9/1955 | Banks | |
| 2,766,203 A | 10/1956 | Brown | |
| 3,358,422 A | 12/1967 | Van Der Schee | |
| 3,411,270 A | 11/1968 | Cornelius et al. | |
| 3,647,069 A | 3/1972 | Bailey | |
| 3,815,331 A | 6/1974 | Hondermark | |
| 3,972,815 A * | 8/1976 | O'Cheskey et al. | ......... 210/219 |
| 3,993,563 A | 11/1976 | Degner | |
| 4,097,249 A | 6/1978 | Phillips et al. | |
| 4,136,747 A | 1/1979 | Mallory et al. | |
| 4,612,021 A | 9/1986 | Bland et al. | |
| 4,715,869 A | 12/1987 | Ramshaw | |
| 4,737,288 A | 4/1988 | Melis et al. | |
| 4,818,410 A * | 4/1989 | Bellos et al. | ................. 210/639 |
| 4,986,903 A | 1/1991 | Canzoneri et al. | |

(Continued)

OTHER PUBLICATIONS

Patent Abstracts of Japan, vol. 018, No. 233 (C-1195), Apr. 28, 1994 & JP 06 023349 A (Japan Organo Co. Ltd.), Feb. 1, 1994, Abstract.

(Continued)

*Primary Examiner*—Thomas M Lithgow
(74) *Attorney, Agent, or Firm*—Madan Mossman & Sriram PC

(57) ABSTRACT

A mechanical vessel may effectively and simultaneously displace a first undesired gas from within water with a second desired gas, and remove at least one alkaline species and oily matter from the water. The vessel raises the pH of the water and reduces the lime requirement for subsequent lime softening. The vessel receives the water containing the first gas and passes the water through a series of gasification chambers. Each gasification chamber may have a mechanism that ingests and mixes a second gas into the water thereby physically displacing at least a portion of the first gas into a vapor space at the top of each gasification chamber from which it is subsequently removed. There is an absence of communication between the vapor spaces of adjacent chambers. An acid is added to remove the alkaline species, where the first gas is an optional by-product that is also removed.

13 Claims, 2 Drawing Sheets

U.S. PATENT DOCUMENTS

| | | | |
|---|---|---|---|
| 4,990,246 | A | 2/1991 | Blazejczak et al. |
| 5,011,597 | A | 4/1991 | Canzoneri et al. |
| 5,044,761 | A | 9/1991 | Yuhki et al. |
| 5,080,780 | A | 1/1992 | Canzoneri et al. |
| 5,348,648 | A | 9/1994 | Hamdan |
| 5,585,005 | A | 12/1996 | Smith et al. |
| 5,766,321 | A | 6/1998 | Ishihara et al. |
| 6,660,067 | B2 | 12/2003 | Stacy et al. |
| 2003/0213735 | A1 | 11/2003 | Stacy et al. |

OTHER PUBLICATIONS

S. Movafaghian, et al., "Pilot Testing of a New Generation of Induced Gas Flotation Equipment," SPE Production & Facilities, Feb. 2004, pp. 9-13.

\* cited by examiner

MECHANICAL FLOTATION DEVICE FOR REDUCTION OF OIL, ALKALINITY AND UNDESIRABLE GASES

FIELD OF THE INVENTION

The present invention relates to methods and apparatus for removing a gas from a liquid, and more particularly relates, in one embodiment, to methods and apparatus for simultaneously separating a gas, oil and an alkaline species from water.

BACKGROUND OF THE INVENTION

In many industries, including oil, paper and pulp, textile, electricity generating and food processing, there is an ever-present problem of handling water contaminated with various substances. In particular, water is often used to aid in the production of oil and gas on offshore platforms as well as on land. This water is usually pumped into a formation in order to be able to pump oil out.

One process where water is used to recover hydrocarbons is Steam Assisted Gravity Drainage (SAGD). This process has been tested extensively in the heavy oil and bitumen reservoirs in Canada and has been generally successful, particularly in the very viscous Athabasca Tar deposits.

Athabasca Tar (also called bitumen) occurs mainly in the McMurray formation of the Lower Cretaceous, which lies unconformably on an erosional surface of Devonian carbonate rock. The matrix is mostly unconsolidated, very fine to coarse-grained, quartz sand of variable thickness. In places the sand is thick with net pay zones from 20 to 40 meters in thickness, 30-40% porosity and contains 10 to 18 wt % of bitumen. A small fraction of the deposit (<10%) is at a depth sufficiently shallow to allow recovery by open pit mining and this has become a very large industrial activity.

Prior to the demonstration of the SAGD process, several other processes for the in situ recovery of Athabasca tar were tested. These included cyclic steam stimulation, in situ combustion, electric heating, and other horizontal well processes. All of these approaches were relatively disappointing and SAGD is the only process that has shown economic potential.

The SAGD process involves a long horizontal production well located at the bottom of a reservoir. Steam is injected into a second horizontal well placed a few meters above this producing well. For very viscous bitumen it is usual to circulate steam in both wells to heat the intervening reservoir and allow communication. After communication is achieved steam is injected continuously into the upper well and condensate and heated oil are removed from the lower one. Production is restricted to allow heated oil and condensate to be produced without live steam. This form of operation is well-established and relatively simple to control. The production well must be long and horizontal so that an economic oil rate can be achieved without steam coning. Conventional vertical wells are not practical with SAGD. Rates of the order of 0.2 to 0.4 or more B/d are achieved per foot length of horizontal well (0.1 to 0.2 m$^3$/d per meter of horizontal length). A production well 750 m long (2460 ft) may produce about 1000 B/d of Athabasca bitumen. After treatment, the produced water is reinjected.

A "Wet Steam Generator" is typically used to produce steam for SAGD operation. The produced water is normally treated to a quality level suitable as feed water to the steam generator. The feed water quality requirements are: oil less than 1 ppm; hardness (expressed as $CaCO_3$) less than 1 ppm, suspended solid less than 1 ppm; and silica less than 50 ppm depending on the pressure rating of the steam generator. Hardness of the produced water can be economically reduced to 1 ppm or less by a zeolite softening process if the total dissolved solid (TDS) in the produced water is less than typically 5,000 ppm. Lime softening will be utilized if the TDS of the produced water is high. "Hot/warm" lime softening has added benefits, in that it will reduce/remove silica content from the produced water.

It is interesting to note that lime will react with $Ca(HCO_3)_2$ and $CO_2$. If the produced water contains excessive alkalinity and $CO_2$, it may be more economical to reduce/remove them prior to the lime softening process. $Ca(HCO_3)_2$ will react with $H_2(SO_4)$ and produce water, $CO_2$ and $CaSO_4$ which will precipitate. Removing alkalinity and $CO_2$ from the produced water will greatly reduce the lime dosage.

If the produced water contains excessive TDS, for instance greater than 5,000 ppm or higher and high silica content, e.g. 50 ppm or higher, then a typical process train for produced water treatment will consist of an oil/water separator, a flotation unit, a lime softening clarifier, a walnut filter and a weak acid ion exchanger and steam generator. If TDS is less than 5,000 ppm and silica content less than 50 ppm, then the process train will consist of an oil/water separator, a flotation unit, a walnut filter and a zeolite ion exchanger.

Apparatus for ingesting and mixing gas into a liquid body are known, such as those of U.S. Pat. No. 3,993,563, that includes a tank, a rotatable impeller fixed to a vertical drive shaft, and a vertically-extending conduit which surrounds the drive shaft and which extends to location in the liquid above the impeller to serve as a channel of communication between a source of gas and the impeller.

U.S. Pat. No. 6,660,067 to Stacy, et al. (Petreco International, Inc.) teaches that a mechanical device may be used to effectively displace a first undesired gas (e.g. oxygen) from within a liquid with a second desired or at least inert gas (e.g. nitrogen). The device is a vessel that receives the liquid containing the first gas and passes the liquid through a series of gasification chambers. Each gasification chamber has at least one mechanism that ingests and mixes a second gas into the liquid thereby physically displacing at least a portion of the first gas into a vapor space at the top of each gasification chamber from which it is subsequently removed. There is an absence of communication between the vapor spaces of adjacent chambers. The ingesting and mixing mechanisms may be a dispersed gas flotation mechanism, and may be a conventional depurator. The liquid now containing the second gas and very little or none of the first gas is removed from the vessel for use.

It would be desirable if a method and apparatus were devised that could simultaneously remove oil, gas and alkaline species from contaminated water.

SUMMARY OF THE INVENTION

Accordingly, it is an object of the present invention to provide an apparatus for simultaneously removing a gas (e.g. $CO_2$) and at least one alkaline species from a liquid, particularly water.

It is another object of the present invention to provide a mechanical, cylindrical gas scavenger machine for chemical scavenger treatment to reduce gas and alkaline species content in a fluid such as water.

Another object herein is to provide a method and apparatus for simultaneously removing a gas, an alkaline species and oil from produced water while raising its pH.

In carrying out these and other objects of the invention, there is provided, in one non-restrictive form, an apparatus for simultaneously removing a first gas and at least one alkaline species from water. The apparatus includes a vessel for receiving a flow of water, where the water comprises a first gas and the alkaline species. The vessel has a plurality of partitions sequentially dividing the vessel into at least a first gasification chamber and a second gasification chamber, where each adjacent chamber fluidly communicates with one another. Each chamber has a vapor space, and there is no communication between the vapor spaces of adjacent chambers. The vessel also has an inlet to introduce the flow of water into the gasification chambers. The vessel additionally includes a gas feed to introduce a second gas into at least the first gasification chamber. In addition to acid injection points in upstream piping, there is also present an acid feed tube to introduce an acid into at least the first gasification chamber to react with the alkaline species in the water. The vessel also includes a mechanism for ingesting and mixing the second gas and the acid into the water of each gasification chamber for creating a turbulent area and for displacing at least a portion of the first gas to the vapor space of each chamber. The vessel additionally has a gas outlet in each chamber for removing the displaced first gas from the vapor space of each chamber; and an outlet for removing clarified water from the vessel.

There is additionally provided, in another non-limiting embodiment a method for simultaneously removing a first gas and at least one alkaline species from water. The method involves providing a vessel having a plurality of partitions sequentially dividing the vessel into at least a first gasification chamber and a second gasification chamber. Each adjacent chamber of the vessel fluidly communicates with one another. Each gasification chamber has a vapor space, and there is no communication between the vapor spaces of adjacent chambers. The method further includes introducing a flow of water that contains a first gas and the alkaline species into the first gasification chamber through an inlet of the vessel. An acid and a flow of a second gas are introduced into at least the first gasification chamber and optionally all chambers. A turbulent area is created in the water of each chamber, and at least a portion of the first gas is displaced by the second gas from the water into the vapor space of the respective gasification chamber. The acid reacts with at least a portion of the alkaline species. The displaced first gas is removed from the vapor space of each gasification chamber, and the clarified water is removed from the vessel through an outlet therein.

It will be appreciated that the Figures are schematic illustrations that are not to scale or proportion to further illustrate the important parts of the invention.

DETAILED DESCRIPTION OF THE INVENTION

The method and apparatus herein address the oil removal and alkalinity reduction of water produced in an industrial operation, such as a hydrocarbon recovery operation utilizing a SAGD technique, including removing a gas dissolved or mixed in the water. In one non-limiting embodiment, the reduction of alkalinity is achieved by adding typically $H_2SO_4$ to react with an alkaline species and produce $CO_2$ and water.

A scrubbing gas will remove $CO_2$ from the produced water and hence increase the pH of the produced water. This will result in the reduction of lime usage in a subsequent lime softening process in two ways: (1) not as much lime is required to react with the alkalinity and (2) for effective lime softening, pH of the water will be in the range of about 9.0 to about 10.3 alternatively in the range of about 9.5 to 10.2; i.e. since the reduction of $CO_2$ will raise the pH of the produced water, the lime requirement is therefore reduced.

Main goals of the invention include, but are not necessarily limited to (a) the addition of acid to convert alkalinity to $CO_2$ and water, by injecting and mixing acid in the each cell (primarily the first cell); (b) introduction of scrubbing gas to strip $CO_2$ from the production water; (c) the raising of pH due to the removal of $CO_2$ from the produced water in that it will reduce the lime requirement for lime softening downstream; and (d) the removal of oil from the produce water. All these four functions can be achieved by the invention simultaneously.

The present invention will be further described, by way of example, and not limitation, with the influent or treated liquid being water that contains a first gas, at least one alkaline species, and optionally oil, that is treated to at least partially remove the first gas, the alkaline species and the oil, if present. However, it will be appreciated that the invention is not limited to this particular liquid or to these particular gases or to the particular alkaline species discussed. It is expected that the methods and apparatus will find utility with liquids other than water and gases other than carbon dioxide ($CO_2$) and alkaline species other than calcium bicarbonate ($Ca(HCO_3)_2$). It is to be understood that the present invention has utility in numerous applications in which it is desirable to replace one gas from a liquid with another, and that the replaced gas, the liquid containing the new gas, or both may be the desired product of the process. Further, the skimmed oil from the liquid or the clarified liquid itself or both may be desired products.

Figure 1:
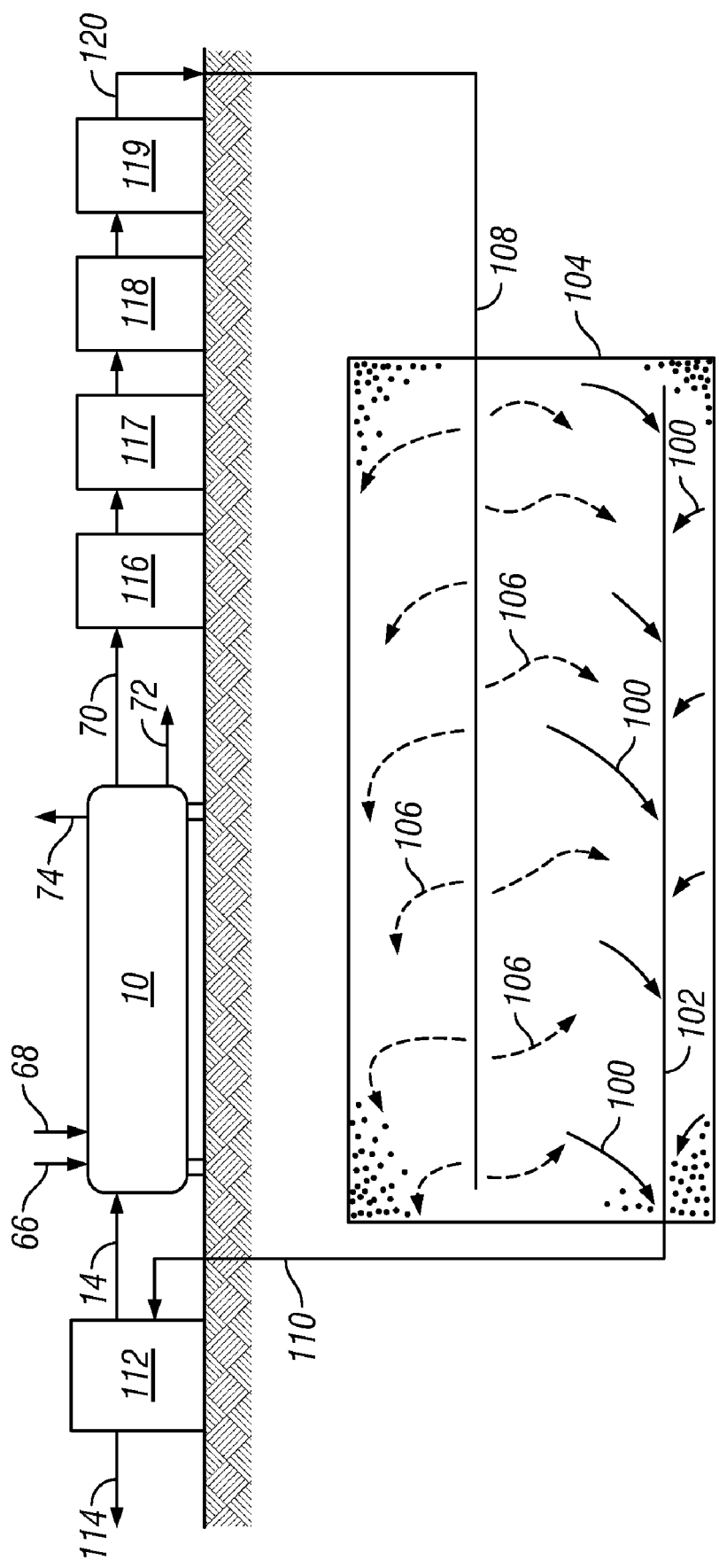
FIG. 1 is a schematic illustration of the mechanical flotation device of the invention integrated into a steam assisted gravity drainage (SAGD) process.

Shown in FIG. 1 is a schematic illustration of one embodiment of mechanical flotation device 10 of the invention integrated into a steam assisted gravity drainage (SAGD) process obtaining steam condensate and heated hydrocarbons 100 (oil, bitumen, and the like) from first horizontal production well 102 in the lower part of subterranean formation 104 as steam 106 is injected into second horizontal well 108 positioned above production well 102. Produced steam condensate and heated hydrocarbons 100 are removed through production line 110 and separated in oil/water separator 112 into hydrocarbon portion 114 and produced water portion 14 which is sent to mechanical flotation unit 10.

Produced water 14 containing a first gas (e.g. $CO_2$), at least one alkaline species, and likely hydrocarbon contaminants (e.g. oil, bitumen, and the like) is treated in flotation apparatus 10 with second gas 66 and acid 68 to give clarified water 70, skimmed hydrocarbons 72 and removed first gas 74 (e.g. $CO_2$). Clarified water 70 is treated in a lime softening clarifier 116, walnut filter 117 and unit 118, which may be a zeolite or weak acid ion exchanger or the like, before being heated into steam 106 by wet steam generator 119 and injected into formation 104 through injection line 120.

Figure 2:
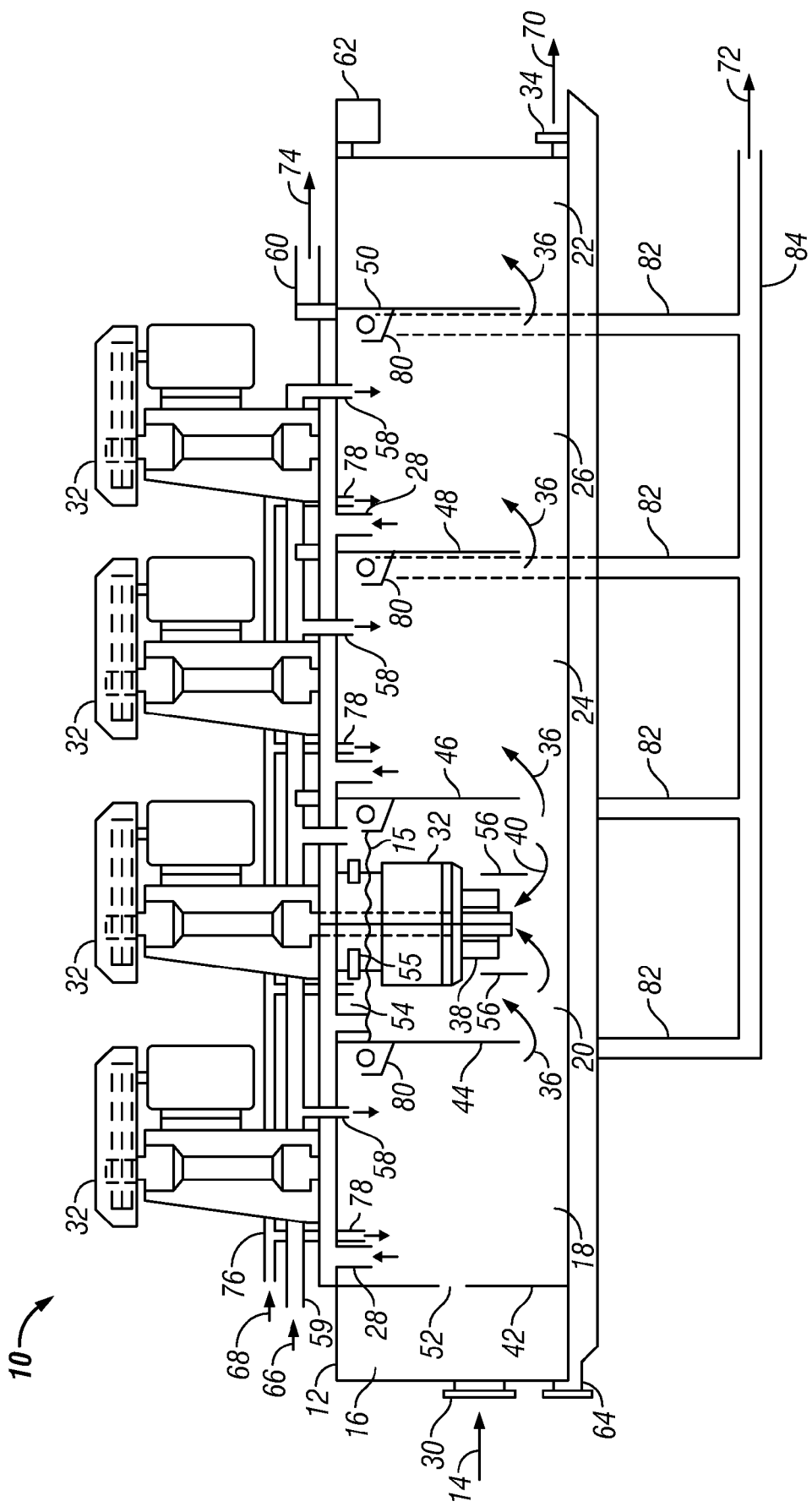
FIG. 2 is a schematic, cross-sectional illustration of one embodiment of the mechanical flotation device of the invention.

Referring now to the FIG. 2, the flotation unit 10 of the apparatus of one embodiment of the invention includes a vessel 12 for receiving a flow of liquid 14 having a first gas, at least one alkaline species and optionally oil or other hydrocarbon mixed therewith, where the vessel 12 in one embodiment has a continuous cylindrical sidewall and is capable of withstanding substantial internal pressures. Vessel 12 is divided into a feed box or inlet chamber 16, at least a first gasification chamber 18, a second gasification chamber 20, and an outlet or discharge chamber 22, where each adjacent chamber can fluidly communicate with one another, that is, that a fluid in one chamber may and should flow into an adjacent chamber in a sequential or ordered manner.

The outlet chamber 22 may optionally function in secondary first gas chemical scavenging. Outlet chamber 22 may optionally provide an injection booster pump plus level control as typically used in the process, though these latter functions will not influence the removal of the first gas by the second gas. It should be apparent that the flow of the liquid is from the inlet 30 to the outlet 34. The particular vessel 12 shown in FIG. 2 also contains third and fourth gasification chambers 24 and 26, respectively. The chambers 16, 18, 20, 24, 26, and 22 are divided by a plurality of generally vertical partitions 42, 44, 46, 48, and 50 respectively. Partition 42 may, in one non-limiting embodiment, extend from the top and bottom of the interior of vessel 12 and have an aperture 52 in the middle thereof to permit the fluid to flow into first gasification chamber 18. Partitions 44, 46, 48, and 50 extend from the interior top of vessel 12 downward, and are spaced away from the interior bottom of vessel 12 to allow fluid communication between the adjacent chambers therebeneath. The flow of liquid 14 follows liquid transport path 36 through the vessel 12, although within each chamber, some back flow 40 of liquid 14 into the impeller or rotor 38 will occur during agitation and mixing.

Each gasification chamber 18, 20, 24 and 26 may be, but is not required to be, essentially identical in design. Only gasification chamber 20 is shown in detail, and it may be assumed for the purposes of this non-limiting explanation that the other gasification chambers are the same. Each gasification chamber 18, 20, 24, and 26 will have a vapor space 54 above the liquid 14 level 15, but the vapor spaces of the adjacent chambers are not in communication with one another. Most preferably, there is an absence of communication between the vapor space of any gasification chamber with the vapor space of any other gasification chamber. The lengths of partitions 42, 44, 46, 48, and 50 are calculated to minimize the effect of pressure differential due to difference in flow rates under each respective partition.

Inlet chamber 16 has an inlet 30 to introduce the flow of liquid 14 to the inlet chamber 16. Each gasification chamber 18, 20, 24 and 26 has at least one mechanism 32 for ingesting and mixing gas into the liquid of each respective gasification chamber 18, 20, 24, and 26 for creating a turbulent area where the second gas 66 displaces the first gas to an upper portion or vapor space 54 of the vessel 12 for each respective chamber 18, 20, 24, and 26. Gas ingesting and mixing mechanisms 32, in one non-limiting embodiment, may be submerged rotor mechanisms, and are preferably the devices of U.S. Pat. No. 3,993,563, incorporated by reference herein. Mechanisms 32 may also be depurators. Mechanisms 32, such as described in U.S. Pat. No. 3,993,563, may each include one or more gas standpipe ports 55 to transfer gas into the rotor assembly of mechanism 32 from the vapor space 54 in the upper portion of vessel 12. Generally, mechanisms 32 create a vortex that draws gas from vapor space 54 into the liquid. It is not the intent of the apparatus or method to re-circulate gas from the vapor space when removing the first dissolved gas with a second ingested gas. The second gas 66 will be introduced via an external gas connection or feed 58 from second gas feed line 59 which will be attached to a source external to vessel 12.

The gas ingesting and mixing mechanisms 32 obtain their source of second gas 66 from gas feed or inlet 58 off second gas feed line 59 in each gasification chamber 18, 20, 24, and 26. The second gas 66 may be, in one non-limiting embodiment, natural gas, which is typically found along with the hydrocarbons in the subterranean formation 104, or may be a different gas. Each gas inlet 58 may be located within the standpipe diameter of each gasification chamber 18, 20, 24, and 26 in one non-limiting embodiment herein. Vertical draft tube 56 of generally cylindrical configuration is present between impeller 38 and vapor space 54. Communication between gas feed 58 and the gas ingesting and mixing mechanisms 32 is by means of conduits not shown in the Figure. Second gas 66 may be, but is not necessarily injected into the vapor space 54 in each chamber 18, 20, 24 and 26. Instead, the first gas 74 (e.g. $CO_2$) displaced from the fluid 14 collects in the vapor spaces 54 and is removed from vessel 12 by tank exhaust 60 through vents 28, at least one of which is located in each chamber 18, 20, 24, and 26. In some cases it is permissible for a portion of second gas 66 that passes through the liquid in each chamber to be channeled through tank exhaust 60, although in the embodiment where second gas 66 is natural gas, it should, of course, not be vented to the atmosphere. It may be desirable or necessary for the vents 28 from the vapor space 54 in each gasification chamber to be equipped with a one-way gas valve to prevent backflow of the displaced first gas 74. That is, it is not a requirement of the apparatus or method that all of the second gas 66 introduced into vessel 12 be carried out in fluid 14 as it exits through outlet 34, although this is the more typical expectation.

The second gas, e.g. natural gas, is induced into the liquid, e.g. water, to have the first gas 74 removed by the mechanisms 32. This process also provides a means of controlling the partial pressure parameters, and allows the second gas 66 to displace the first gas 74, e.g. $CO_2$, thus scavenging $CO_2$ from the water 14. The first gas 74 is physically not chemically displaced from the fluid 14 by the second gas 66 in this process. Henry's Law of partial pressures requires that the first gas 74 be displaced as the second gas 66 is introduced. With each succeeding chamber, more of the first gas 74 is replaced at each point. The number of stages or chambers is not critical, but should be sufficient in number to reduce the concentration of the first gas 74 in the fluid to the desired level. It is expected that several gasification chambers would be necessary to remove sufficient amounts of the first gas 74 in most cases. It should be apparent that the method of the invention is a continuous process. It is desirable to predict and control the amount of second gas 66 ingestion based on rotor submergence of 32 and speed of rotor or impeller 38 to achieve the desired removal level for the first gas 74, and the rate at which the second gas 66 is ingested.

Gas ingesting and mixing mechanisms 32 may also include water draft tubes (not shown) to transfer water 14 into the rotor assemblies of mechanisms 32 exclusively from the bottom of the vessel 12. Inclusion of the water draft tube facilitates capacity variations within the same geometry because all water 14 that enters the rotor assembly is directed to the rotor suction from the bottom of vessel 12, reducing fluid by-pass and short circuiting of the fluid 14 around the turbulent areas. The treated effluent flows out of vessel 12 via outlet 34 which may have a valve therein (not shown). Flow through the vessel 12 is maintained via pumps or innate system pressure (not shown).

Another part of mechanical flotation device 10 is an acid conduit 76 for introducing acid 68 into at least the first gasification chamber 18, and likely the other gasification chambers 20, 24 and 26, via acid feed tubes 78. The acid is to treat and remove or convert the alkaline species in the fluid 14 of which there is at least one in fluid 14. In one non-limiting embodiment of the invention, the alkaline species is calcium carbonate, more accurately thought of as calcium bicarbonate, $Ca(HCO_3)_2$. In another non-restrictive version, the acid is sulfuric acid ($H_2SO_4$), although it may be understood that other acids may be used in some embodiments. The reaction (I) in this non-limiting embodiment may be represented as:

$$H_2SO_4 + Ca(HCO_3)_2 \rightarrow CaSO_4(gypsum) + 2H_2O + 2CO_2\uparrow \quad (I)$$

The gypsum is soluble in the water and precipitates later in the lime softening clarifier 116, the water product stays in the water 14 becoming clarified, and the evolved carbon dioxide is removed from the water 14 as previously described. The acid dosage to reduce alkalinity expressed is based on stoichiometric. For instance, for each ppm of $H_2SO_4$ added, there is 0.88 ppm of $CO_2$ produced.

Some very important goals are accomplished by the apparatus and methods herein: (a) the addition of acid 68 converts alkalinity to $CO_2$ and water by injecting and mixing acid in the each chamber (primarily the first chamber 18, in one non-limiting embodiment), (b) the introduction of scrubbing gas 66 (e.g. natural gas) to strip $CO_2$ from the production water 14, and (c) the raising of pH due to the removal of $CO_2$ from the produced water. The removal of $CO_2$ will reduce the lime requirement for lime softening downstream in unit 116.

A fourth goal of (d) the removal of oil 72 from the produced water 14 is accomplished by skimming the oil or other suspended oily matter or hydrocarbon from the surface 15 of liquid 14, such as by using channels or troughs 80 in each chamber 18, 20, 24 and 26. The oily matter is channeled through pipes 82 to collection conduit 84 to yield skimmed hydrocarbons 72. Skimmed hydrocarbons 72 may be processed and combined with hydrocarbon portion 114 for further handling and refining.

There may also be present in vessel 12 a liquid level controller 62 of any suitable kind, to regulate the rate at which fluid 14 enters vessel 12. The apparatus 10 may also have a control mechanism, such as a programmable logic controller (PLC) (not shown) for controlling the liquid level 15 in the gasification chambers 18, 20, 24, 26 by obtaining level information from level transmitters (not shown) and regulating the liquid flow through level control valves (LCVs, not shown) which is in fluid communication with the liquid in each chamber, and flow control devices to regulate flow of gas and acid to and from the vessel. The exact natures of the control devices and overall control system are not critical and may be conventional in the art; however, their implementation in the scavenging and treatment apparatus 10 of the invention is expected to be inventive.

In one embodiment of the invention, the gas scavenging and liquid treatment apparatus 10 has a dual-cell design, that is, only two gasification cells, 18 and 20, but more may be used as seen in FIG. 2. An optional chemical scavenging feed unit (not shown), which is a standard feed unit for dispensing a metered amount of a first gas scavenging chemical, into fluid 14, to additionally treat the fluid for achieving optimum separation of the first gas 74 from the water 14 can be provided. This optional chemical treating may occur in outlet chamber 22, but may occur in other chambers instead or in addition thereto. However, it may be appreciated that such an additional chemical scavenger treatment may not be necessary. Other optional additives may include, but are not necessarily limited to polymers in low concentrations for coalescing oil droplets, e.g. ionic polymers such as cation polymers.

Although not shown, valves may be provided for blowdown of sludge that collects in the bottom of vessel 12. A drain 64 for cleaning out vessel 12 may also be provided. Also not shown are optional gauges to monitor the pressure of the effluent and the flow of gas.

In the method of the invention, a continuous flow of liquid 14 having a first gas 74 (e.g. $CO_2$) mixed or dissolved therewith is introduced into inlet chamber 16 through inlet 30. Fluid 14 flows past partition 42 into the gasification chambers 18, 20, 24, and 26 sequentially via liquid transport path 36. In each chamber a flow of second gas 66 (e.g. natural gas) is introduced into the water 14 by gas ingesting and mixing mechanisms 32, creating a turbulent area in the entirety of chambers 18, 20, 24, and 26, and allowing the second gas 66 to physically displace the first gas 74. The first gas 74 is forced out of the liquid 14 as bubbles to the upper portion of vessel 12 where it collects in the respective vapor space 54 of each chamber. First gas 74 is collected through vents 28 and removed through tank exhaust 60.

Acid 68 is introduced into the fluid 14 of chamber 18 to react with the alkaline species (e.g. $Ca(HCO_3)_2$) such as according to reaction (I) in one non-limiting embodiment. The water product stays in fluid 14 and the carbon dioxide by-product is removed as described with respect to first gas 74. At least some oily matter suspended on the surface 15 of water 14 is collected by channel 80.

Fluid 14, progressively more free of first gas 74, alkaline species and oily matter, next underflows each partition 44, 46, 48, and 50 in turn flows through liquid outlet 34. It will be appreciated that it is not possible to predict with accuracy how much of the first gas 74 may be removed from the liquid 14 since such removal depends upon a number of complex, interrelated factors including, but not limited to, the nature of the gases, the nature of the liquid, the concentration of the first gas 74 in the liquid, the ability of the liquid 14 to absorb the second gas 66, the temperature of the liquid 14, the pressures within the vessel 12, and the like.

The rate at which clarified liquid 70 is removed from vessel 12 may be regulated by a valve or valves (not shown) in response to software program commands or other control mechanism.

To summarize, advantages of the invention include, but are not necessarily limited to, decreased number of treatment stages by simultaneous reduction in suspended matter and alkalinity of the feed water for steam flood or other similar water treatment facilities, resulting in simplification of operation and reduced capital costs, particularly as compared with a process where these functions are performed separately. In other words, three treatment stages are combined into one. These advantages are achieved through a first gas scavenging machine (e.g. depurator) using physical methods to displace a first undesired gas with a second gas. Alkaline species are treated with acid. The removal of originally present $CO_2$ and $CO_2$ byproduct raises the pH of the water to reduce the lime requirement in a downstream lime softener. Oily matter and the like are successively skimmed from each chamber for essentially complete removal. In most expected methods of using the apparatus, it is anticipated that the effluent only contain small quantities of the second gas. Alternatively, it may be that the liquid contains appreciable amounts of the second gas, and this is acceptable.

In the foregoing specification, the invention has been described with reference to specific embodiments thereof, and has been demonstrated as effective in providing a device and apparatus for removing or stripping an undesired gas from a liquid, simultaneously removing or reacting at least one alkaline species therein, and optionally removing oily contaminants at the same time. However, it will be evident that various modifications and changes can be made thereto without departing from the broader spirit or scope of the invention as set forth in the appended claims. Accordingly, the specification is to be regarded in an illustrative rather than a restrictive sense. For example, the distances between the partitions and the volumes of the various chambers may be changed or optimized from that illustrated and described, and even though they were not specifically identified or tried in a particular apparatus, would be anticipated to be within the scope of this invention. Similarly, gas ingestion and mixing mechanisms, and level transmitting and control devices different from those illustrated and described herein would be expected to find utility and be encompassed by the appended claims. Different first and second gases, different alkaline species and acids, and different oily matter other than those described herein may nevertheless be treated and handled in other non-restrictive embodiments of the invention.

We claim:

1. An apparatus for simultaneously removing a first gas and at least one alkaline species from water, comprising:
   a) a vessel for receiving a flow of water, where the water comprises a first gas and the alkaline species;
   b) a plurality of partitions sequentially dividing the vessel into at least a first gasification chamber and a second gasification chamber, each adjacent chamber fluidly communicating with one another, each chamber having a vapor space, in the absence of communication between the vapor spaces of adjacent chambers;
   c) an inlet to introduce the flow of water into the gasification chambers;
   d) a gas feed to introduce a second gas into at least the first gasification chamber;
   e) an acid feed tube to introduce an acid into each gasification chamber to react with the alkaline species;
   f) a mechanism for ingesting and mixing the second gas and the acid into the water of each gasification chamber for creating a turbulent area and for displacing at least a portion of the first gas to the vapor space of each chamber; and
   g) a gas outlet in each chamber for removing the displaced first gas from the vapor space of each chamber; and
   h) an outlet for removing clarified water from the vessel.

2. The apparatus of claim 1 further comprising a control mechanism for controlling the water level in the vessel and a flow control mechanism for the gas.

3. The apparatus of claim 1 where the mechanism for ingesting and mixing is a submerged rotor mechanism.

4. The apparatus of claim 1 further comprising an exhaust for removing the first gas from the apparatus.

5. The apparatus of claim 1 further comprising a channel in each gasification chamber to remove oil suspended on the water from each chamber.

6. The apparatus of claim 5 adapted to simultaneously reduce suspended matter, alkalinity and pH adjustment of the water, resulting in simplification of operation and reduced operating and capital costs as compared with a process where reducing suspended matter, alkalinity and pH adjustment of the water are performed separately.

7. An apparatus for simultaneously removing a first gas, at least one alkaline species, and oil from water, comprising:
   a) a vessel for receiving a flow of water, where the water comprises a first gas, oil, and the alkaline species;
   b) a plurality of partitions sequentially dividing the vessel into at least a first gasification chamber and a second gasification chamber, each adjacent chamber fluidly communicating with one another, each chamber having a vapor space, in the absence of communication between the vapor spaces of adjacent chambers;
   c) an inlet to introduce the flow of water into the gasification chambers;
   d) a gas feed to introduce a second gas into at least the first gasification chamber;
   e) an acid feed tube to introduce an acid into each gasification chamber to react with the alkaline species;
   f) a mechanism for ingesting and mixing a second gas and the acid into the liquid of each gasification chamber for creating a turbulent area and for displacing at least a portion of the first gas to the vapor space of each chamber;
   g) a gas outlet in each chamber for removing the displaced first gas from the vapor space of each chamber;
   h) a channel in each gasification chamber to remove oil suspended on the water from each chamber
   i) an outlet for removing water from the vessel; and
   j) a control mechanism for controlling the water level in the vessel.

8. A gas and alkaline species removal apparatus comprising:
   a) a vessel comprising an inlet and an outlet;
   b) a plurality of partitions between the inlet and the outlet sequentially dividing the vessel into at least a first gasification chamber and a second gasification chamber, each adjacent chamber fluidly communicating with one another, each chamber having a vapor space, in the absence of communication between the vapor spaces of adjacent chambers;
   d) a gas feed in at least the first gasification chamber, each gas feed having a flow control device;
   e) an acid feed tube in each gasification chamber, each acid feed having a flow control device;
   f) a first gas and acid ingesting and second gas displacing mechanism in each gasification chamber; and
   g) a gas outlet in each chamber, each gas outlet having a flow control device.

9. The apparatus of claim 8 further comprising a control mechanism for controlling a liquid level in the vessel and a flow control mechanism for the gas.

10. The apparatus of claim 8 where the mechanism for ingesting and displacing is a rotor mechanism adapted to be submerged into a liquid.

11. The apparatus of claim 8 further comprising an exhaust for removing the first gas from the apparatus.

12. The apparatus of claim 8 further comprising a channel in each gasification chamber adapted to remove oil suspended on the water from each chamber.

13. The apparatus of claim 12 adapted to simultaneously reduce suspended matter, alkalinity and pH adjustment of water, resulting in simplification of operation and reduced operating and capital costs as compared with a process where reducing suspended matter, alkalinity and pH adjustment of the water are performed separately.

* * * * *